United States Patent [19]

Goode

[11] 4,256,925
[45] Mar. 17, 1981

[54] CAPACITY REALLOCATION METHOD AND APPARATUS FOR A TDMA SATELLITE COMMUNICATION NETWORK WITH DEMAND ASSIGNMENT OF CHANNELS

[75] Inventor: Burwell Goode, Falls Church, Va.

[73] Assignee: Satellite Business Systems, McLean, Va.

[21] Appl. No.: 968,720

[22] Filed: Dec. 12, 1978

[51] Int. Cl.² .............................................. H04J 6/02
[52] U.S. Cl. ...................................... 370/104; 375/3
[58] Field of Search ....................... 179/15 BS; 325/4

[56] References Cited

U.S. PATENT DOCUMENTS

| Re. 28,577 | 10/1975 | Schmidt | 325/4 |
| 3,632,885 | 1/1972 | Herold | 325/4 |
| 3,649,764 | 3/1972 | Maillet | 325/4 |
| 3,848,093 | 11/1974 | Edstrom | 325/4 |

Primary Examiner—David L. Stewart
Attorney, Agent, or Firm—Pollock, Vande Sande & Priddy

[57] ABSTRACT

In a time division multiple access communication system utilizing a satellite for communicating signals between a plurality of ground stations, at spaced times a reference ground station reallocates the total channel capacity of the system among the several ground stations to minimize system blocking and to thereby utilize the available system channel capacity more effectively. To increase the time between successive reallocations, channels are reallocated only when a ground station makes a channel capacity request that is greater than or equal to its corresponding present channel allocation. System blocking is minimized by using a table look-up scheme to generate excess capacity allocation factors for the stations and to thereby determine each station's proportionate share of excess system capacity. An appropriate portion of excess capacity is then added to each station's channel capacity request to provide a new channel allocation for each station. The new channel allocations are transmitted to appropriate ground stations and each station thereafter adjusts its burst duration to correspond to its new channel capacity allocation.

28 Claims, 10 Drawing Figures

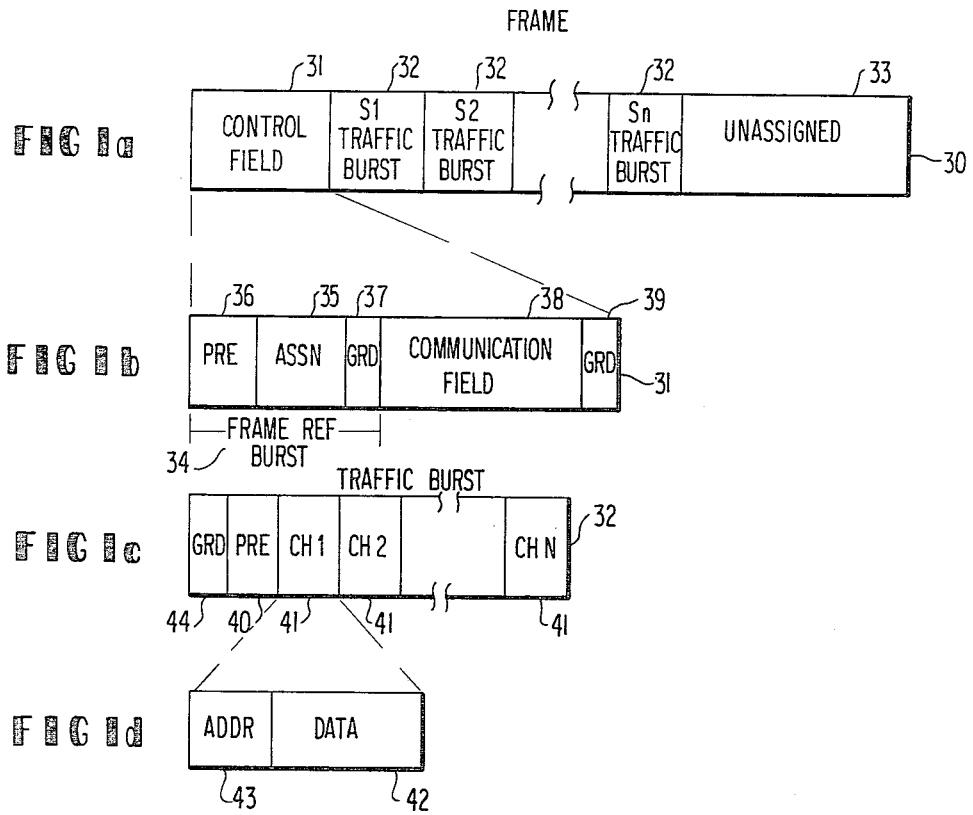
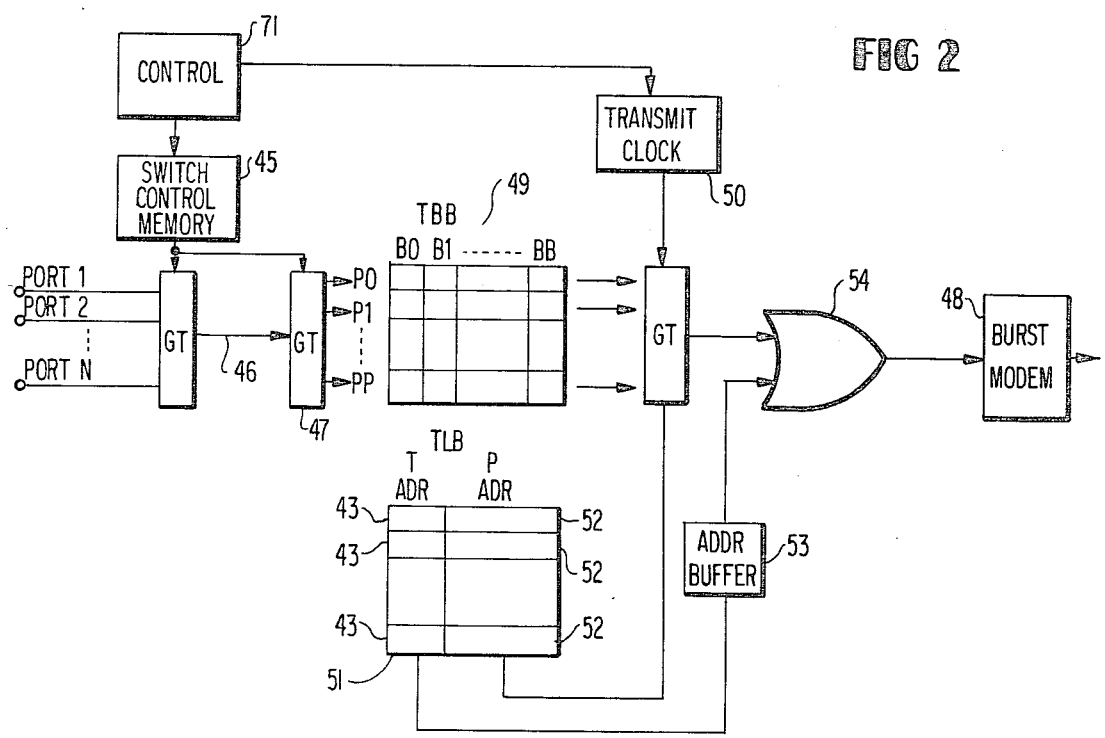

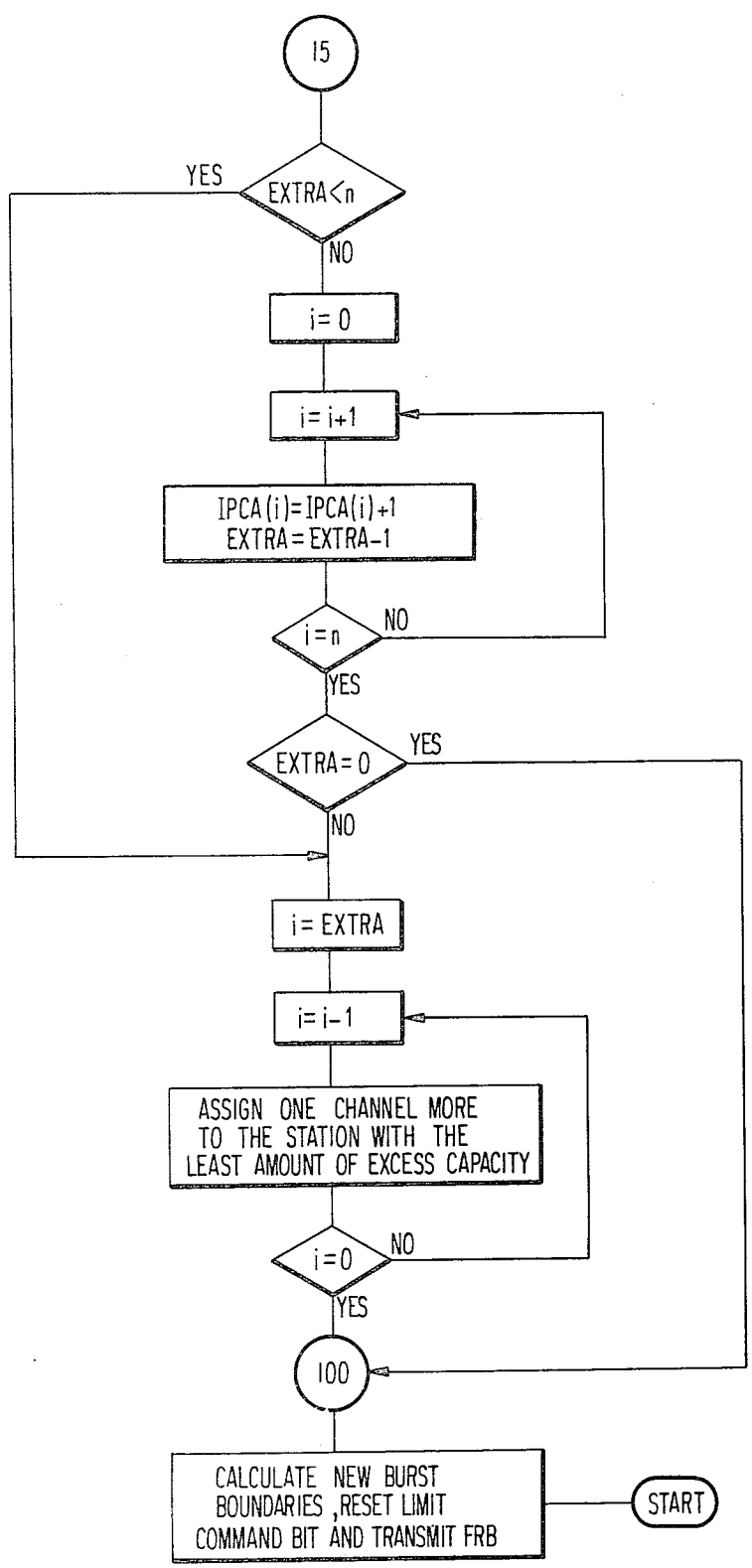

CAPACITY REALLOCATION METHOD AND APPARATUS FOR A TDMA SATELLITE COMMUNICATION NETWORK WITH DEMAND ASSIGNMENT OF CHANNELS

BACKGROUND OF THE INVENTION

The invention relates to the allocation of channels in a TDMA communications system with multiple earth stations and, more particularly, to an apparatus and method for allocating channel capacity among the stations to equalize the probability of call blocking across a network, and to minimize the call blocking probability while maintaining a moderate average reallocation frequency.

Time division multiple access systems that utilize a satellite to provide a communications link between a plurality of earth stations are necessarily limited to a particular number of system channels.

In a TDMA system, each channel corresponds to a fixed number of sequentially-transmitted bits of information. The total number of available channels is determined by the transmitting bit rate, which in turn is limited by the transponder bandwidth and power of the satellite.

Each channel provides a single voice or data communications path between a transmitting and a receiving ground station. The transmitting station transmits its signal to a satellite transponder, which retransmits the signal to the receiving station. For so long as data or voice signals are transmitted over a communication path, the associated channel is in use and is therefore not available to establish a further communications link. Blocking results when an attempted call can not be completed due to the unavailability of an idle communications channel.

Typically, each TDMA earth station periodically transmits a multi-channel burst with a burst duration that is a function of the number of transmitted channels. The transmission bursts of the stations occur in a sequential non-overlapping timed sequence and a fixed duration system transmission cycle or frame includes the transmission bursts of all of the stations. Thus, an increase in channel capacity for a particular station necessarily requires an increased burst duration for the station and, since a TDMA frame is of fixed duration, an increase in burst duration or channel capacity for a particular station must necessarily arise from an allocation of extra channels from a pool of unused frame channel capacity or a corresponding reduction in the channel capacity or burst duration of another station. Therefore, since the total number of communication paths is limited by the number of available channels, it is apparent that some scheme must be employed to assign or dedicate particular channels to specific stations so that each station is assured that at least a few communications channels will be available at any given time.

One such prior art allocation scheme permanently assigned a fixed number of channels to each station, based upon the station's average expected communications traffic. However, as indicated in the U.S. Pat. No. 3,644,678 to Schmidt, "Channel Reallocation System and Method", such a permanent preassigned channel allocation system is inefficient due to the fact that large fluctuations in the traffic load at a particular station results in excessive blocking of signals during heavy load periods and inefficient use of channel capacity during light load periods.

Thus, in order to avoid such inefficiency, it is necessary to allocate system channels among the various ground stations on a demand basis. In accordance with a system of this type, each ground station periodically demands a number of communication channels that is sufficient to handle its current traffic load. A reference station in the communication network thereafter allocates to each station the number of channels necessary to meet its demand and then allocates the excess system capacity equally among the stations.

It has also been proposed to allocate excess channel capacity in proportion to station capacity requests in a demand allocation system. However, this type of allocating scheme results in unequal blocking probabilities at different stations since an earth station that requests a small amount of capacity will necessarily experience a higher proportion of blocked calls than earth stations in the same network that request more capacity. Thus, such a demand allocation system would necessarily require a high reallocation rate in order to reduce the probability of blocking.

A demand allocation system as described in the U.S. Pat. No. 3,644,678, would allocate excess capacity equally to each earth station in the network. However, although this method would simplify the reallocation computations, it would also result in unequal blocking probabilities at the different earth stations, since stations requesting large amounts of capacity would necessarily have a higher proportion of blocked calls than stations requesting less capacity.

Accordingly, it is an object of the invention to provide a simple and effective apparatus and method to reallocate excess system capacity in order to maintain a uniformly low blocking probability at earth stations that have widely varying capacity requirements.

A further object of this invention is to provide a simple and effective means to reduce the reallocation frequency of the system and to thereby reduce the computational time expended in operating the system.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the demand assignment channel reallocation system, according to the present invention, includes an apparatus and a method for reallocating the channel assignments of each earth station in a TDMA satellite communications system in order to reduce the probability of call blocking for each station in the system and to reduce the frequency of channel reallocation. In such a system, blocked voice calls are busyed out, i.e. ignored, while some or all of the blocked data calls are queued for transmission when capacity becomes available.

More particularly, each earth station transmits a minimum channel capacity request in accord with a request algorithm which may take into account voice calls only or both voice and data calls. When at least one station in the system generates a capacity request that equals or exceeds a given threshold, for example the present channel allocation, the channel capacity of each of the stations is reallocated. However, the reallocation is inhibited if the ratio of the excess capacity of each station to the station's present channel allocation is less than a thrashing factor and there are no data ports waiting in queue at any station.

The reallocation method and apparatus of the invention employs a table look-up scheme to generate for each station an excess capacity allocation factor that is a function of the channel capacity request of the station. The table uses as its input a capacity request to support the off-hook calls of a type which are not eligible for queueing, i.e. voice calls. The entry in the table is the amount by which the instantaneous number of off-hooks of the non-queued type exceeds the averge, X% of the time, where X is the desired grade of service. The table entries might reasonably be approximated as proportional to the square root of a station's channel request to support off-hook calls of the non-queued type.

The ratio of the excess capacity allocation factor of each station to the sum of the allocation factors of all of the stations is used to determine each station's proportionate share of the excess system channel capacity. For each earth station, a minimum capacity allocation is generally defined by the capacity request of the station or a minimum capacity that is reserved for the earth station. The excess capacity of the network is defined as the difference between the network capacity and the sum of the minimum capacity allocations. A constant minimum amount of the excess capacity may be allocated to each earth station to help minimize the blocking probability at the station.

When the excess capacity allocation for all of the stations has been determined, the reference station assigns each earth station a new channel allocation that is equal to the sum of the station's voice channel capacity request, data channel capacity request and allocated share of excess capacity. Each station uses its channel allocation to set the burst duration during which a transmit burst buffer is enabled so that the duration of the data transmission burst of the station corresponds to the time equivalent of the channel allocation for the station.

BRIEF DESCRIPTION OF THE DRAWINGS

In the drawings:

FIGS. 1a–1d show the format of a transmission frame for the satellite communications system.

FIG. 2 shows a block diagram transmit burst buffer and transmit list buffer of a station in the satellite communications system.

FIG. 7 shows a flow chart of computer program steps for a demand reallocation system according to the method of the invention.

DETAILED DESCRIPTION OF PREFERRED EMBODIMENTS

Figure 3:
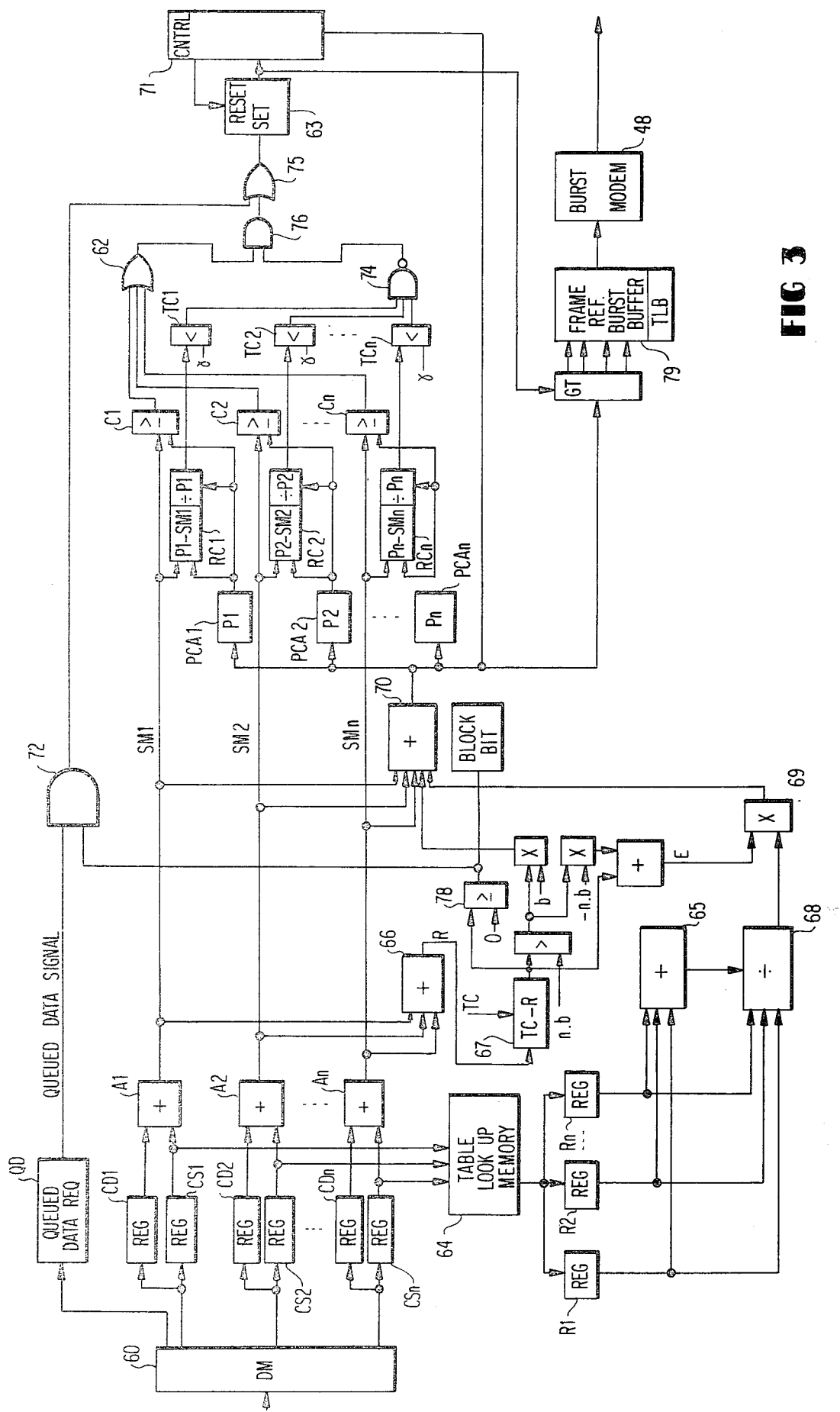
FIG. 3 shows a block diagram of the demand reallocation apparatus of the invention.

The remaining portion of this specification will describe preferred embodiments of the invention when read in conjunction with the attached drawings, in which like reference characters identify identical apparatus.

The ground stations in a TDMA satellite communications system communicate with one another over communications channels established through a satellite transponder link. The traffic over these channels can originate with any source, although voice and data are typical sources.

Each station communicates with the satellite transponder by means of a multi-channel communications burst and the concatenated transmission bursts of all of the earth stations combine to form a communications frame. The number of communications channels in the frame is determined by the TDMA bit rate.

FIG. 1a illustrates the data format for the TDMA frame 30 of the satellite communications system. The frame is repeated in a timed sequence and includes a control field 31 and successive traffic burst fields 32 that are defined by the transmission bursts of the system earth stations Sl–Sn. The frame may also include a field of unassigned channels 33, corresponding to the unused capacity of the system.

As illustrated in FIG. 1b, the frame control field 31 includes a frame reference burst portion 34 that includes an assignment portion 35 that contains the channel allocations of the various earth stations in the form of burst boundary data for each station. The burst boundary data for each station define the number of channels that the station is allowed to transmit in its traffic burst.

The frame reference burst 34 also includes a frame preamble portion 36 that provides carrier recovery and bit timing recovery informtion. In addition, a specified guard portion 37 is included to provide a transmission free period in order to avoid overlapping of the frame reference burst 34 and an adjacent control communications field 38.

The control communications field 38 contains the current channel capacity requests and the queued data status of the various earth stations in the system and may provide satellite ranging information. A guard portion 39 follows the control communications field to avoid overlap between the field and the preamble portion of the next succeeding TDMA burst.

FIG. 1c illustrates a typical earth station traffic burst 32 that includes a burst preamble 40 and the particular nonoverlapping traffic channels 41 that are included in the station's traffic burst. It should be appreciated that the maximum number of channels that may be included in a station's traffic burst is determined by the current channel allocation or burst boundary assignment of the station. However, depending upon the current traffic load at the station, the station may actually need a number of channels that is less than its currently assigned amount.

The preamble portion 40 of the traffic burst 32 typically contains carrier recovery and bit timing recovery information that is used to synchronize a receiver in the receiving earth station, and an address word that identifies the transmitting station.

As shown in FIG. 1d, each channel portion 41 of the traffic burst 32 includes a channel data word 42 and a transmit address portion 43. The data word 42 contains the channel data that is to be transmitted to a particular receiving earth station and the transmit address portion 43 contains the address of the receiving station. A guard portion 44 is provided at the beginning of each traffic burst to avoid signal overlap between adjacent bursts.

The channel data word portion of a station's traffic burst contains the messages that are sent between stations and may include data or voice transmissions. Of course, each channel provides a communications path between a transmitting ground station and a receiving ground station and the various receiving stations receive all of the transmitted channel data and extract data from channels having their respective particular addresses. It should be appreciated that the traffic burst formats for the stations S1-Sn are the same except, of course, for the number of channels that are allocated to each station.

In operation, a transmitting station turns on its transmitter carrier and transmits to the satellite and hence to the other earth stations during its burst time. It should be appreciated that the stations initiate their transmissions in a sequential timed relation so that the traffic burst of each station appears at the satellite just after the termination of the burst from the preceding station.

Each earth station has a Transmit Burst Buffer 49 (TBB) that defines the station's traffic burst transmission to the satellite transponder. As shown in FIG. 2, the TBB 49 is divided into PP partitions, each of which has a maximum capacity of BB bits. Each of the partitions of the TBB is adapted to store at least one channel data word, for example the data word 42 of FIG. 1d.

As shown in FIG. 2, data at any input port 1-N is gated into one or more partitions PO-PP of the TBB 49. More particularly, a station controller 71, for example a mini-computer, causes a switch control memory 45 to generate a data select signal to select the data at a particular port and to apply the data to a transmit bus 46. The switch control memory 45 thereafter activates the input gates 47 to gate the selected data of the transmit bus 46 into a memory storage partition PO-PP of the TBB 49. The writing of data into the TBB may continue until all partitions of the TBB are filled or until it is time to transmit data from the TBB.

Data is transmitted from the TBB to a burst modem 48 in response to transmit pulses from a transmit select apparatus 50. The sequence in which the TBB partitions PO-PP are transmitted to the burst modem may be determined by a transmit list buffer 51 (TLB). The TLB contains stored partition addresses 52 that are paired with corresponding transmit addresses 43 and arranged in a particular priority sequence.

The stored address pairs are sequentially read from the TLB and the partition address 52 of each TLB pair is used to randomly access a partition in the TBB 49 to read the data stored in the partition into the burst modem 48. Thus, the stored data in the TBB is accessed in a sequence defined by the priority order of the address pairs in the TLB 51, and the accessed TBB partition data is written to the burst modem 48.

It should be appreciated that as each partition of the TBB is accessed by a TLB address pair and written to the burst modem 48, the associated transmit address 43 of the pair is also passed to the burst modem, for example through an address buffer 53 and an OR gate 54. Thus, the burst modem 48 receives a serial stream of channel information, wherein each channel includes a data field 42 defined by an associated partition of the TBB and a transmit address 43 defined by the transmit address portion of a TLB address pair.

The serial stream of channel data is received by the burst modem 48 and transmitted to the satellite transponder at a specified TDMA bit rate for as long as the transmit select apparatus 50 continues to generate transmit signals. Of course, the starting and stopping of the transmit select apparatus 50 determines the number of partitions that are read out of the TBB and the corresponding number of channels that are transmitted to the satellite transponder during the station's traffic burst. Thus, the transmit select apparatus 50 of each station is operated in accord with the station's current capacity allocation and associated burst boundaries to define the traffic burst of the station.

It should be apparent from the above discussion that a TLB is not essential to the operation of the TBB since the partitions of the TBB could be read sequentially in a fixed priority scheme rather than randomly in a priority scheme defined by a TLB.

In accordance with the invention, a reference station periodically reallocates channels among the stations on a demand basis. Thus, the number of communication channels that is allocated to a station is related to the channel capacity request that was previously sent by the particular station.

An apparatus for demand allocating channels within the system is illustrated by the block diagram of FIG. 3. For purposes of discussion, the apparatus of FIG. 3 will be described with respect to a particular system reference station. However, it should be appreciated that the apparatus of FIG. 3 should be included at all earth stations of the system in order to enable any earth station to operate as the system reference station.

As shown in FIG. 3, a demultiplexer 60 at a reference station receives satellite transmission signals from the various earth stations and transmits the capacity requests of each station and the queued data status of the stations to associated storage registers. More particularly, in accordance with a preferred emboiment of the invention, a voice channel capacity request component of each station is stored in an associated CS register, a data channel capacity request component of each station is stored in an associated CD register, and a queued data register QD receives the queued data status information from the stations and provides a queued data signal if any station has data ports waiting in queue.

Of course, without departing from the spirit of the invention, the capacity request for voice channels might more generally be considered a request for capacity to accomodate low priority calls, which would be blocked if capcacity were not available. Likewise, the capacity request for data might more generally be considered a request for capacity to accomodate high priority calls, which will be queued if capacity is not immediately available.

It will be appreciated upon an examination of FIG. 3 that the capacity request registers CD1 and CS1 respectively store the data and voice capacity requests of the earth station S1 and, more generally, the registers CDn and CSn store the capacity requests of the nth earth station Sn. Alternatively, a register could be used to store the sum of the capacity requests for voice and data. In addition, the present channel allocations P1-Pn for the stations S1-Sn are stored in corresponding present channel allocation registers PCA1-PCAn.

After the channel capacity request data for the earth stations S1-Sn have been read into corresponding pairs of CD and CS registers, the contents of the pairs of CD and CS registers are added by associated adders A1-An and the respective resulting sums SM1-SMn are applied to associated comparators C1-Cn. The stored values P1-Pn of the present channel allocation registers PCA1-PCAn are also applied to the comparators C1-Cn and, if any station's capacity request sum SMn is greater than or equal to its present channel allocation Pn, the associated comparator Cn will force a high at the output of an OR gate 62. The high output of the OR gate 62 will then force a high at the output of an AND gate 76 unless the AND gate 76 is inhibited by a low at the output of a thrashing check gate 74. If the output of the AND gate 76 goes high, a system reallocation signal will be generated through an OR gate 75.

The thrashing check gate 74 operates to avoid an excessive reallocation frequency or "thrashing" by inhibiting the generation of a reallocation signal if there are no data ports waiting in queue for assignment of channels and if for each station in the communication network the ratio of the excess capacity Pn-SMn requested for the station to the present channel allocation Pn for the station is less than a particular system thrashing constant $\gamma$. If any station in the system has queued data, the queued data register QD will apply a high queued data signal through AND gate 72 to the OR gate 75 to generate the system reallocation signal.

It should be apparent from an examination of FIG. 3 that ratio computation devices RC1–RCn operate to subtract the total capacity request for each station SMn from the present channel allocation Pn of the station and to divide the resultant amount by the station's present channel allocation Pn. Thereafter, the ratio is compared to the thrashing constant $\gamma$ and, if the ratio for each station is less than the thrashing constant $\gamma$, the thrashing check comparators TC1–TCn generate corresponding high signals to force the output of the thrashing check gate 74 low to inhibit the gate 76 and to thereby block any system reallocation that is initiated by the comparators C1–Cn.

A total capacity request R is obtained by an adder 66. The difference between the total capacity TC and R is obtained by a subtractor 67. If the total capacity TC is sufficient to accomodate the total capacity request R, then the output of a comparator 78 will be positive and a positive queued data signal will trigger a reallocation signal through gates 72 and 75. However, if TC is less than R, the output of the comparator 78 will be zero and reallocation will not be triggered by a positive queued data signal. The output of the comparator 78 is transmitted to all of the stations in the network, and it is called the "block bit". When the block bit is positive, there is sufficient network capacity and no action is taken. However, when the block bit is zero, there is insufficient network capacity and each local station controller blocks all incoming calls of the nonqueued type. As calls terminate naturally, the demand for network capacity will decrease until there is sufficient network capacity to accommodate the queued data calls. When the output of the comparator 78 indicates that there is sufficient network capacity, capacity will be reallocated and calls will no longer be blocked.

The system reallocation signal, when present, will set a "limit" flag, for example a flip-flop 63 and the set condition of the flag will then be sensed by the reference station controller 71 in a manner known to the art. The controller 71 will thereafter initiate the necessary control signals to operate the apparatus of the invention to allocate system capacity among the earth stations. Thus, the controller 71, flag flip-flop 63 and frame reference burst (FRB) transmit buffer 79 will operate to set a limit command bit in the next frame reference burst that is transmitted after the setting of the flip-flop 63.

The limit command bit will be received by all of the system earth stations and the stations will thereafter use only a specified portion of their currently assigned excess capacity. The stations will continue to operate in this excess capacity limitation mode until the reference station transmits the system reallocation assignments and resets the limit command bit.

In a system according to the invention, there is a basic assignment cycle time T, for example 300 milliseconds, during which the capacity requests of the several earth stations are transmitted. The decision whether to set the limit command bit, if it is not already set, may be made once every T seconds. After the limit command bit is set, there is a delay period, for example 0.5 seconds, and thereafter the new capacity requests of the stations are received, loaded into the appropriate registers and the new allocations are computed.

It should be appreciated that the limit command bit is adapted to limit the utilization of excess capacity during the time period between the initiation of a system reallocation and the transmission of the reallocation assignments by the reference stations. Thus, during this reallocation time period the stations may use a certain minimum of their previously assigned but unused capacity in order to accomodate momentary fluctuations in traffic load. However, this minimal utilization of excess capacity will not materially affect the accuracy of the reference station's reallocation assignments.

After the limit command bit has been transmitted to the stations and the stations have been allowed sufficient time to receive the command, the new capacity requests for the stations are read and a table look-up apparatus, for example a random access memory 64, is activated. The memory 64 includes a stored data list of excess capacity allocation factors that is accesssed by the voice channel request data that is stored in the various CS registers. For example, if an excess capacity allocation factor is defined as the square root of a station voice channel capacity request, a voice channel request i accesses the ith element of the factor table that is stored in the memory 64, and the value of the ith element, the square root of i, is retrieved.

It is noted that if the capacity request i contains a fractional portion, a simple computer-generated interpolation rounds the capacity request up to the next higher integer value and the integer approximation of the capacity request is then used to access the factor table stored in the memory 64. It should be understood that new capacity requests may be received shortly after the "limit" flag is set. New requests received approximately one-half second after transmitting the "limit" command are used in the table look-up.

It should be appreciated that, in general, the capacity allocation factors of the memory 64 related to the amount by which the instantaneous voice channel request exceeds the average channel request, X% of the time, where X% is the desired blocking probability. Thus, the capacity allocation factors can be found by applying known statistical methods, based upon appropriate assumptions about the traffic and the behavior of callers when calls are blocked or delayed. Therefore, the invention is not limited to the use of a particular statistical distribution in calculating the capacity allocation factors, but embraces within its scope capacity allocation factors that are computed by applying statistical principles known to the art.

In addition, it is noted that either the station data channel capacity requests or the total channel capacity requests could be used to access corresponding excess capacity allocation factors. Also, it should be appreciated that in calculating the excess capacity allocation factors, any fractional portion is dropped and, thereafter, the integer sum of the fractional portions is distributed among the stations.

The excess capacity allocation factors that are generated by the memory 64 are stored in corresponding registers or other memory means, Rl-Rn. Thus, a channel capacity request for the earth stations Sl address the memory 64, generates an excess capacity allocation factor corresponding to the channel capacity request, and stores the factor in R1. Likewise, the excess capacity allocation factors that are associated with the channel capacity requests of the stations S2-Sn will be generated by the memory 64 and stored in the respective factor registers R2-Rn.

The excess capacity allocation factors that are stored in the registers R1-Rn are added by an adder 65 and also the capacity request sums of th stations S1-Sn are added by the adder 66. The sum of the station capacity requests R is subtracted from the network capacity TC in the subtractor 67 to determine the excess network capacity. Then the excess capacity D is compared to n·b (where n is the number of stations and b is minimum excess capacity allocation) to determine whether there is sufficient excess capacity to add a minimum excess capacity allocation amount b to the request of each station. If the excess capacity D is greater than n·b, the b channels are added to the requests of each of the stations in the network and the new excess $E = D - n·b$ is used to allocate the remaining excess capacity. If D is not greater than n·b, then b channels are not added to the requests of any of the stations and $E = D$.

The minimum excess channel allocation amount b defines a small excess channel allocation that is provided to insure that each station receives at least a minimum amount of excess capacity. Of course, it should be appreciated that such a minimum excess allocation amount is not essential to the operation of the method and apparatus of the invention and therefore the minimum excess allocation amount could be reduced to zero without departing from the spirit of the invention.

A new channel allocation amount is generated for each station by the cooperation of a multiplexer-divider 68, a multiplexer 69, and a multiplexer-adder 70 in a manner known to the art. For example, for the S1 station, the divider unit 68 generates a ratio of the S1 excess capacity allocation factor R1 to the sum of the excess capacity allocation factors R1-Rn. The multiplier 69 then multiplies this S1 ratio times the excess capacity amount E and transmits the resultant S1 portion of the excess capacity to the adder unit 70.

The adder unit 70 then generates a new channel allocation amount for S1 by adding the sum of the S1 channel capacity requests, CS1 and CD1, the minimum station channel allocation amount b, and the S1 portion of the excess capacity.

In accordance with the above operation, the new channel allocation amounts of the stations S1-Sn are stored in the corresponding present channel allocation registers or memory means PCA1-PCAn and the capacity allocations are used by the reference station controller 71 to calculate the times at which each station's traffic burst must begin and end at the satellite. These exact times are called burst boundaries and were previously described with reference to the TDMA frame structure. The burst boundaries are then transmitted to the earth stations to define each station's channel allocation. In addition, the limit control bit is reset and is transmitted with the channel allocation data to signal the completion of a system reallocation to the earth stations.

It should be apparent from the above discussion that the total capacity request of each station will be compared with its corresponding PCA register and, if the reallocation actuation signal is not generated, the demultiplexer 60 will receive new channel capacity request information from the earth stations and a new comparison cycle will thereafter be initiated.

It should be appreciated that the apparatus of the invention can easily be adapted to compare the data channel capacity request or voice channel capacity request to a corresponding present channel allocation register without departing from the essential spirit of the invention. In addition, it is noted that although the above apparatus has been described with respect to memory storage registers, any means to store data could be used including, for example, disc storage, tape storage, or computer memory storage.

Moreover, it should be understood that the reallocation method of the invention may be used to reallocate channel capacity among stations in a particular network or specified group of networks in a multi-network satellite communications system. In such a system, each network would be a separate entity for purposes of capacity allocation and, therefore, the apparatus of the invention could allocate excess capacity within a network on the basis of the network excess capacity and the capacity requests of stations included within the network.

It should be appreciated that the demand reallocation system of the invention may be implemented by means of a digital computer. FIGS. 4, 5, 6 and 7 illustrate a flow chart of suggested computer program steps that could be used in conjunction with a digital computer to implement the demand reallocation method of the invention.

Figure 4:
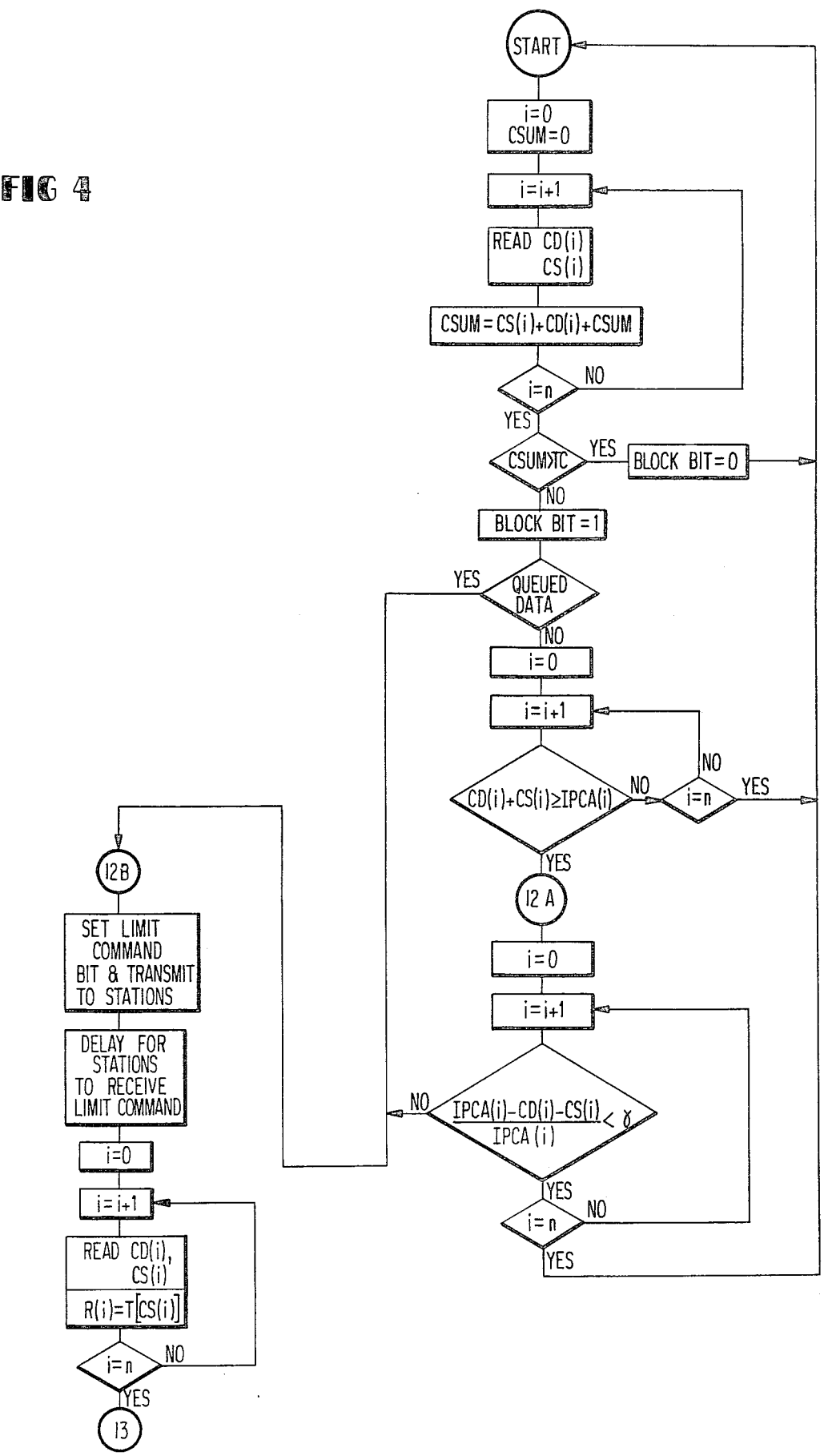
FIG. 4 shows a flow chart of computer program steps for a demand reallocation system according to the method of the invention.

In accordance with the method of the invention and referring to FIG. 4, a counter i is initially set to 0 and, as the counter i is incremented, successive data channel allocation request CD(i) and voice channel allocation requests CS(i) are read from registers or other memory locations of the computer. It is noted that the channel allocation request data for each of the earth stations was previously received in a manner known to the art by a transmission receiver unit, for example a demultiplexer, and was then written into appropriate registers or memory locations of the computer.

Thus, each earth station has associated with it a corresponding register or memory location containing a data and voice traffic channel capacity request. This data is read in accord with the computer program and is placed in computer memory locations defined by CD(i) and CS(i). For instance, the data channel allocation request for a station S1 is stored at a memory location defined by CD(1) and the voice channel allocation request for the station is stored at a memory location defined by CS(1). Successive earth stations have their channel allocation requests stored at successive positions of the computer memory array locations of CD(i) and CS(i).

Following each reading of a station channel allocation request, a sum, CSUM is formed of total requested capacity. If this exceeds total capacity the block bit is zeroed, preventing reallocation. If not, then the station is checked to determine if it has queued data. If the station has queued data, the program branches to a table look-up reallocation routine 12B for reallocating system capacity. However, if the station does not have queued data, the value of the counter i is returned to zero and each station request is compared to present allocation. If a station request equals or exceeds present allocation, a branch is made to a check thrashing routine 12A.

However, if $CD(i)+CS(i)$ is less than $IPCA(i)$, the counter i is checked to determine if it is equal to the number n of earth stations in the system. If i is not equal to n, i is incremented by 1 and the channel capacity request $CD(i)+CS(i)$ and the present channel allocation $IPCA(i)$ for the next earth station Si are compared. If the channel allocation request for the earth station Si is less than the present channel allocation for Si, the counter i is incremented and the comparison loop is continued.

If the channel allocation requests for all stations are compared and no channel allocation request is greater than or equal to a corresponding present channel allocation, the counter i is returned to 0 and the new channel allocation requests are read into the computer for subsequent comparison. However, if during the comparison loop a channel allocation request is greater than or equal to a present channel allocation, the program branches to the check thrashing routine 12A.

The check thrashing routine 12A provides a means to avoid an excessive reallocation frequency or thrashing by blocking a reallocation if, for each station, the ratio of the excess capacity requested for Si, $IPCA(i)-CD(i)-CS(i)$, and the present channel allocation for Si, $IPCA(i)$, is less than a particular system thrashing constant $\gamma$, and there are no data ports waiting in queue for assignment of channels.

Thus, in the check thrashing routine 12A, the counter i is successively incremented and the above ratio for each station is compared to $\gamma$. If any station's ratio is equal to or greater than $\gamma$, the program will continue to the table look-up reallocation routine 12B to start the system reallocation. However, if the ratio for a station is less than $\gamma$, the counter i will be checked to determine whether to continue checking station ratios against $\gamma$. If i=n, program control is returned to the read loop routine STRT.

In the table look-up routine 12B, a limit command bit is initially set and is transmitted to the earth stations. Thereafter, the program delays to ensure that the earth stations have received the limit command bit and then reads the new capacity requests of the stations. In addition, a stored table T is accessed for excess capacity allocation factors at corresponding addresses $CS(i)$, where $CS(i)$ is an integer or is rounded to an integer value. For example, the excess capacity allocation factor $T[CS(i)]$ could be defined by the square root of $CS(i)$. The excess capacity allocation factor $T[CS(i)]$ is stored at a computer location defined by $R(i)$. Thus, the voice channel allocation request $CS(i)$ for each earth station is used to "look up" a corresponding capacity allocation factor $T[CS(i)]$ for that earth station and the factor is then stored at a memory location $R(i)$ that is associated with the particular earth station.

Alternatively, if $CS(i)$ is not an integer, the table look up could be used to generate integer-accessed boundary values for the excess capacity factor relating to $CS(i)$, and the actual value of the excess capacity factor could then be determined by interpolating between the boundary values.

Figure 5:
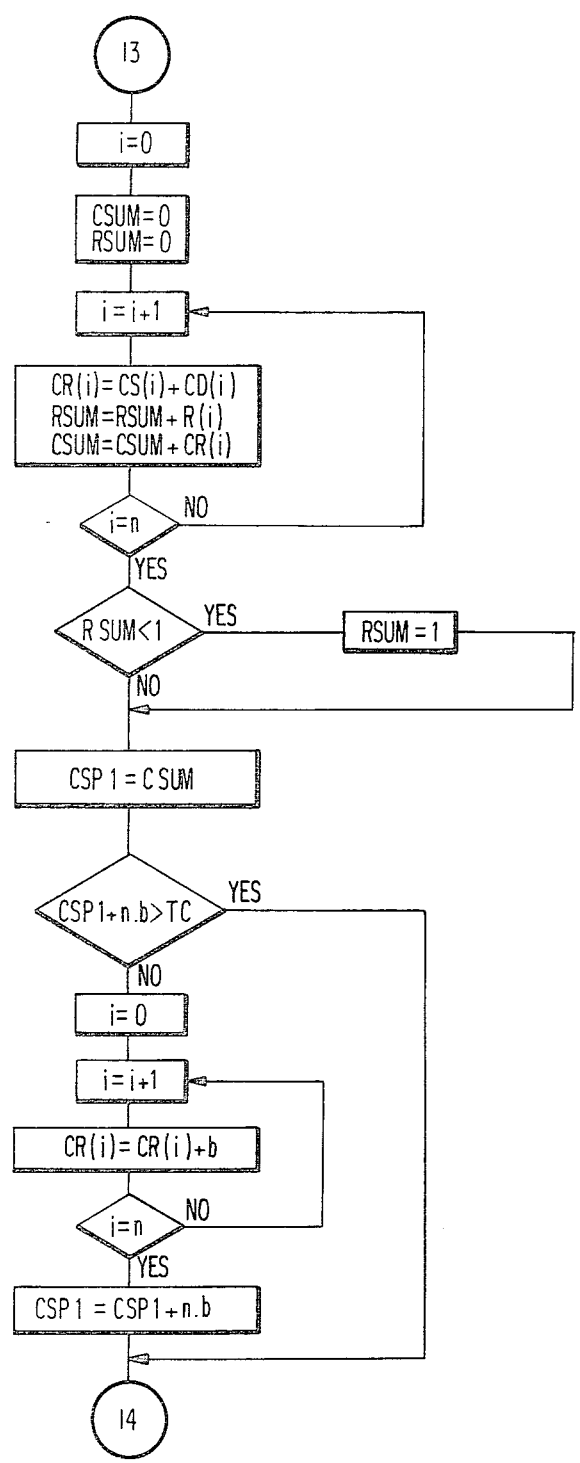
FIG. 5 shows a flow chart of computer program steps for a demand reallocation system according to the method of the invention.

After particular excess capacity allocation factors have been assigned to each of the earth stations in the system, the program thereafter continues to a reallocation computation routine 13 in which the sum of all excess capacity allocation factors $R(i)$ is stored at a location defined by the name RSUM. As can be seen in FIG. 5, the channel allocation requests $CS(i)$ and $CD(i)$ for all of the earth stations are also summed and the sum is stored at location CSUM.

Following the above summing operations, the program checks the total request to determine whether there is enough excess network capacity to add the minimum station channel allocation amount to the request for each station without exceeding the network capacity. If the sum of the excess capacity allocation factors $R(i)$ is less than one (which would occur if there were no capacity requests for voice), RSUM is set equal to one. A new parameter CSP1 is defined to be the total capacity request. If there is enough excess capacity, CSP1 is augmented by a minimum excess channel allocation constant $(b \cdot n)$, and the minimum excess channel allocation amount b is added to each station channel request $CR(i)$. It should be understood that the factor b in the expression corresponds to a minimum excess channel allocation amount that may be any positive number or zero. However, in a preferred embodiment of the invention, the amount b is one. If $CSP1+n \cdot b$ is greater than the network capacity TC, the minimum excess channel allocation amount b is not added to the individual station channel allocation requests.

Figure 6:
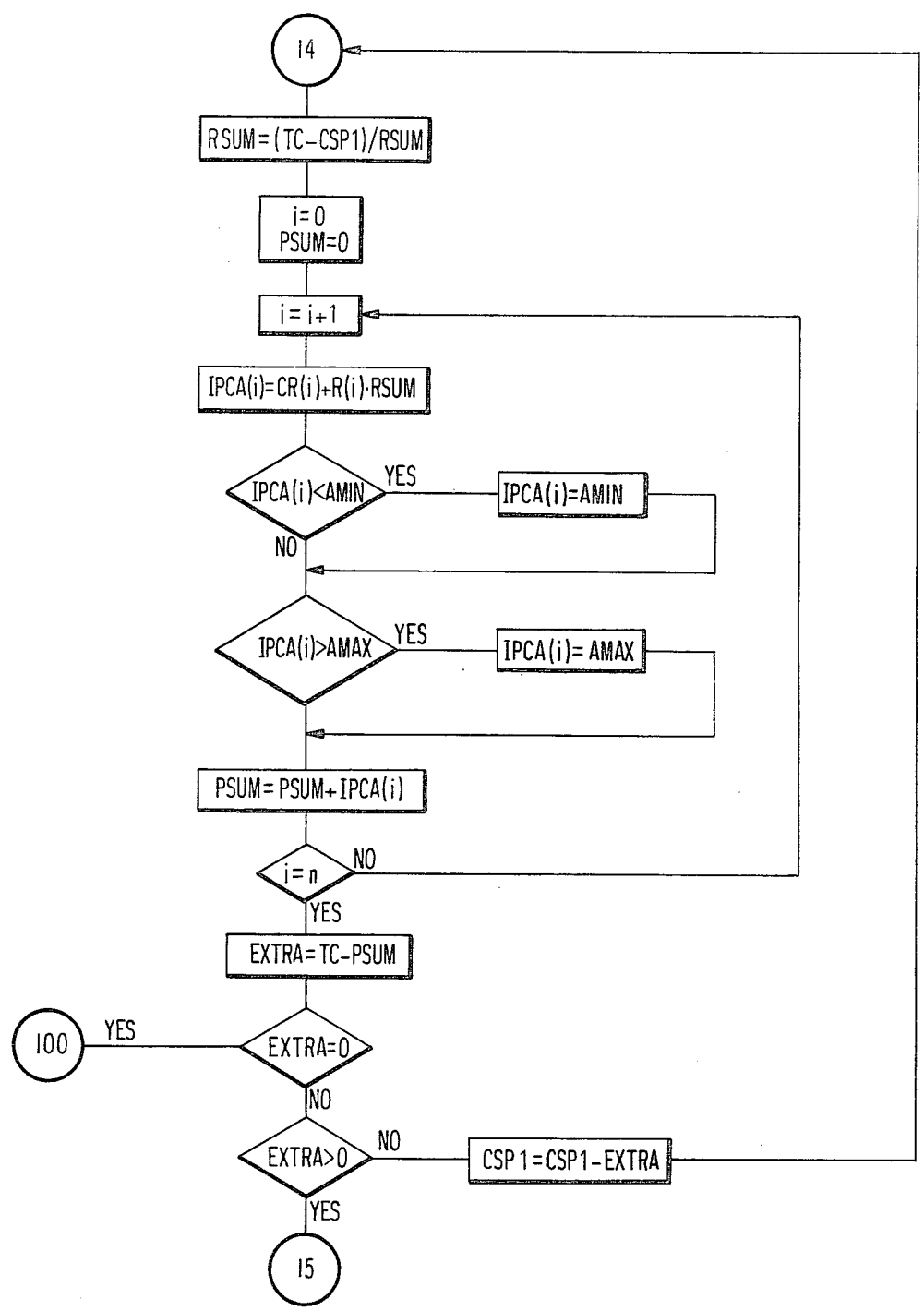
FIG. 6 shows a flow chart of computer program steps for a demand reallocation system according to the method of the invention.

Next the program executes the assignment calculation routine 14 of FIG. 6. The parameter RSUM is redefined to be (TC-CSP1)/RSUM, a normalized measure of the excess capacity in the network. Thereafter, the program computes new channel allocation amounts $IPCA(i)$ for each of the earth stations. The new allocation for each station is equal to the adjusted channel allocation request $CR(i)$ plus a portion of the system excess capacity that is defined by the product of the excess capacity allocation factor $R(i)$ of the station and the normalized measure of excess capacity RSUM. If the computed channel allocation amount is less than a defined minimum allocation AMIN or greater than a maximum permissible allocation AMAX, the channel allocation amount is set to the appropriate minimum or maximum value as shown in FIG. 6. The sum of the new channel allocations is then stored in PSUM.

The sum of the new channel allocations PSUM is then subtracted from the total network capacity TC to determine the number of remaining unassigned channels EXTRA. If all of the network capacity has been assigned, EXTRA will be zero and the program will branch to the burst boundary calculation 100 of FIG. 7.

However, if EXTRA is less than zero, more capacity would be allocated than is available, so the program reduces the value of RSUM, the normalized measure of excess capacity, and recomputes the individual station channel allocation amounts. It should be apparent from FIG. 6 that the assignment calculation process will continue until the value of EXTRA is either zero or a positive number.

If EXTRA is a positive number, the program will continue to a final portion 15 of the reallocation calculation routine. As shown in FIG. 7, EXTRA is checked to determine if it is less than the number n of stations in the network. If EXTRA is less than n, the remaining unassigned channels will be allocated among the stations according to some priority scheme. For example, single channels of the remaining unassigned capacity could be assigned to the stations with the lowest assignments of excess capacity. Thereafter, the program will continue to the burst boundary calculation routine 100.

If EXTRA is greater than or equal to n, one additional channel will be allocated to each station in the network, and then, if there is no unassigned excess capacity, the program will continue to the boundary calculation routine 100 to complete the reallocation process.

However, if after an additional channel has been assigned to each station, EXTRA is found to be not equal to zero, the remaining unassigned channels will be allocated among the stations in accord with the priority scheme mentioned above or some other scheme.

After the reallocation channel amounts for the earth stations are determined, the program continues to the routine 100 to calculate the burst boundaries for the stations and reset the limit command bit. The new burst boundaries will subsequently be transmitted to all the stations in the system by means of the frame reference burst. As explained above, the earth stations thereafter adjust the operation of their transmit burst buffers in accordance with the new capacity allocations.

Following the final reallocation determination and transmission of the new burst boundaries, the program returns control to the read loop routine START in order to begin reading the new channel allocation requests from the earth stations.

It should be apparent from the above discussion that the method of the invention is not limited to a particular mathematical relation between the channel capacity request of a station and the station's associated excess capacity allocation factor. In addition, it is noted that the method of the invention is not limited to using the voice channel capacity request CS for accessing the table T. For, either the data channel capacity request CD or the sum of the voice and data capacity requests could be used to perform the same functions.

The invention may be embodied in other specific forms without departing from its essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method of demand allocating communications channels among a plurality of stations communicating with one another through a transponder in earth orbit in a TDMA communications system, comprising the steps of:
   receiving channel capacity requests from a plurality of said stations;
   initiating a reallocation of the channel capacity assignments of said stations when the total capacity request of at least one station exceeds a corresponding threshold channel capacity for the station, the steps for reallocating including,
   defining a particular channel capacity request for each station that includes the capacity request for at least one class of channels of the station,
   defining an exces capacity allocation factor for each of said stations that is a nonlinear function of said particular channel capacity request of the station,
   defining an excess capacity amount for said communication system by subtracting the sum of the capacity requests of the stations and a minimum system channel allocation from the total channel capacity of the system, and
   allocating to each of said stations a number of channels that is at least equal to the sum of the corresponding capacity request of the station, an additional minimum station channel allocation, and a portion of said excess capacity amount that is defined by the ratio of said excess capacity allocation factor of the station to the sum of the excess capacity allocation factors of all of the stations; and
   transmitting data including the reallocated channel capacity assignments to said stations.

2. The method of claim 1 wherein said threshold channel capacity is the present channel allocation for the station.

3. The method of claim 2 including initiating a reallocation of the channel capacity assignments of said stations when the total capacity request of at least one station is equal to its present channel allocation.

4. The method of claim 1 including receiving a queued data signal from each station to indicate if a station has data ports waiting in queue for channel assignment.

5. The method of claim 4 including reallocating the channel capacity assignments of the stations if at least one station has data ports waiting in queue and the total of the capacity requests for all stations is less than the total capacity of the system.

6. The method of claim 4 wherein an initiated reallocation is inhibited if no station has data ports waiting in queue and if for each station the ratio of the excess capacity requested for the station to the station's present channel allocation is less than a system thrashing constant.

7. The method of claim 1 including reallocating the channel capacity assignments of the stations if a reallocation is initiated and if for at least one station the ratio of the excess capacity requested for the station to the station's present channel allocation is greater than a system thrashing constant.

8. The method of claim 1 wherein said step for for defining an excess capacity allocation factor includes selecting a particular excess capacity allocation factor from a table at an address corresponding to said particular channel capacity request of the station.

9. The method of claim 8 wherein said particular channel capacity request is the voice channel capacity request of the station.

10. The method of claim 9 wherein said excess capacity allocation factor is the square root of the voice channel capacity request.

11. The method of claim 1 wherein said step for defining an excess capacity amount includes defining said minimum system channel allocation as the product of said minimum station allocation and the number of stations in said communication system.

12. The method of claim 11 wherein said minimum station channel allocation is zero.

13. The method of claim 1 further comprising the steps of:
   setting a limit command bit when reallocation is initiated;
   transmitting the set limit command bit to said stations in the system;

limiting each station's utilization of currently assigned excess capacity to a specified amount when said set limit command bit is received by the station;

reallocating the channel capacity assignments of the stations; and resetting said limit command bit to allow each station to use its assigned capacity after said channel capacity assignments are reallocated.

14. The method of claim 1 including defining the number of additional unassigned channels when the available system capacity exceeds the allocated capacity; and assigning the additional channels to the stations with the lowest amounts of allocated excess capacity.

15. An apparatus for demand allocating the total channel capacity of a communication system among a plurality of stations in the system comprising:

means for receiving and storing a capacity request for each of said stations;

means for initiating a reallocation of the channel capacity assignments of said stations when the capacity request of at least one station exceeds a corresponding preset threshold channel capacity for the station;

reallocation means for allocating a particular portion of the total system channel capacity to each station, said reallocation means including, means for defining a particular channel capacity request for each station that includes the capacity request for at least one class of channels of the station;

a table look-up means for defining for each of said stations an excess capacity allocation factor that is a function of said particular channel capacity request of the station, and computation means for computing a system excess capacity amount defined by the difference between the total system capacity and the sum of the total capacity requests of the stations and a minimum system channel allocation, and for generating for each of said stations a new channel allocation that is defined at least by the total capacity request of the station, a minimum station channel allocation, and a fractional portion of said excess capacity amount that is defined by the ratio of the excess capacity allocation factor of the station to the sum of the excess capacity allocation factors of all of the stations; and means for transmitting data including the reallocated channel capacity assignments to said stations.

16. The apparatus of claim 15 including means for storing the present channel allocation for each station to define the station's threshold channel capacity.

17. The apparatus of claim 16 wherein said means for initiating a reallocation includes means to initiate a reallocation when the total capacity request of at least one station is equal to the station's corresponding present channel allocation.

18. The apparatus of claim 15 including means for receiving a queued data signal from each station for indicating whether a station has data ports waiting in queue for channel assignment.

19. The apparatus of claim 18 including means for reallocating the channel capacity assignments of the stations if said queued data signal receiving means indicates that at least one station has data ports waiting in queue and the total of the capacity requests for all stations is less than the total capacity of the system.

20. The apparatus of claim 18 including means for computing the ratio of the excess capacity requested for a station to the station's present channel allocation; and means for comparing said ratio to a system thrashing constant and for inhibiting the initiation of said reallocation if for each station said ratio is less than said thrashing constant and said queued data means indicates that no station has data waiting in queue.

21. The apparatus of claim 15 including means for computing the ratio of the excess capacity requested for a station to the station's present channel allocation; and means for comparing said ratio to a system thrashing constant and for reallocating the channel capacity assignments of the stations if a reallocation is initiated and the ratio for at least one station is greater than said thrashing constant.

22. The apparatus of claim 15 wherein said table look-up means includes an addressable memory for storing excess capacity allocation factors at addresses that correspond to the possible values of said particular channel capacity request.

23. The apparatus of claim 22 wherein said memory stores capacity allocation factors defined by the square root of said particular channel capacity request.

24. The apparatus of claim 22 wherein said memory includes means for accessing a capacity allocation factor defined by the square root of the voice channel capacity request of a station at an address corresponding to a particular channel capacity request defined by the voice channel capacity request of the station.

25. The apparatus of claim 15 wherein said computation means includes means for defining the minimum system channel allocation as the product of the minimum station channel allocation and the number of stations in the communications system.

26. The apparatus of claim 15 wherein said computation means includes a computer programmed to compute the new channel allocations for each of the stations.

27. The apparatus of claim 15 including means for setting a limit commmand bit when reallocation is initiated and resetting the bit after reallocating the total system channel capacity among the stations.

28. The apparatus of claim 27 wherein each of said stations includes means for limiting its utilization of currently assigned excess capacity to a specified amount in response to said set limit command bit and to fully utilize its assigned capacity in response to the reset limit command bit.

* * * * *